United States Patent
Kim (10) Patent No.: US 10,563,801 B2
(45) Date of Patent: Feb. 18, 2020

(54) HYDRAULIC TUBE CONNECTOR FOR VEHICLE

(71) Applicants: Hyundai Motor Company, Seoul (KR); Kia Motors Corporation, Seoul (KR)

(72) Inventor: Eun Sik Kim, Whasung-Si (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 152 days.

(21) Appl. No.: 15/643,238

(22) Filed: Jul. 6, 2017

(65) Prior Publication Data

US 2018/0149298 A1 May 31, 2018

(30) Foreign Application Priority Data

Nov. 28, 2016 (KR) .......................... 10-2016-0159250

(51) Int. Cl.
*F16L 37/14* (2006.01)
*F16L 33/22* (2006.01)
(Continued)

(52) U.S. Cl.
CPC .............. *F16L 33/22* (2013.01); *F16D 31/00* (2013.01); *F16L 33/003* (2013.01); *F16L 37/0841* (2013.01); *F16L 37/0847* (2013.01); *F16L 37/0848* (2013.01); *F16L 37/096* (2013.01); *F16L 37/098* (2013.01); *F16L 37/0987* (2013.01); *F16L 37/1225* (2013.01); *F16L 37/14* (2013.01)

(58) Field of Classification Search
CPC ..... F16L 33/22; F16L 37/1225; F16L 33/003; F16L 37/14; F16L 23/003; F16L 37/0841; F16L 37/0848; F16L 37/0847; F16L 37/096; F16L 37/098; F16L 37/0987; F16L 37/16
See application file for complete search history.

(56) References Cited

U.S. PATENT DOCUMENTS 763,317 A * 6/1904 Nelson .................. F16L 37/096
285/320
3,245,703 A * 4/1966 Manly ................. F16L 37/0847
285/319
(Continued)

FOREIGN PATENT DOCUMENTS

DE 2220115 A1 * 1/1973 ............ F16L 37/098
DE 2811985 * 11/1978
(Continued)

*Primary Examiner* — David Bochna
*Assistant Examiner* — James A Linford
(74) *Attorney, Agent, or Firm* — Morgan, Lewis & Bockius LLP (57) ABSTRACT

A hydraulic tube connector for vehicle may include a connector body including a through hole into which a tube having a tube protrusion protruding outward is inserted, and a pair of guide grooves formed around the through hole and a coupling member configured to couple the tube with the through hole of the connector body, wherein the coupling member includes a tube coupling portion configured to surround the tube and a pair of coupling guides configured to be inserted into the pair of guide grooves.

7 Claims, 9 Drawing Sheets

(51) Int. Cl.

| | |
|---|---|
| *F16L 33/00* | (2006.01) |
| *F16L 37/098* | (2006.01) |
| *F16L 37/084* | (2006.01) |
| *F16L 37/096* | (2006.01) |
| *F16D 31/00* | (2006.01) |
| *F16L 37/12* | (2006.01) |

(56) References Cited

U.S. PATENT DOCUMENTS

| | | | | |
|---|---|---|---|---|
| 7,878,553 B2 * | 2/2011 | Wicks | ................. | A61M 39/105 |
| | | | | 285/272 |
| 2005/0082828 A1 * | 4/2005 | Wicks | ................. | A61M 39/105 |
| | | | | 285/319 |

FOREIGN PATENT DOCUMENTS

| | | | | |
|---|---|---|---|---|
| DE | 3825866 A1 * | 2/1990 | ............ | F16L 37/098 |
| EP | 0 995 938 A2 | 4/2000 | | |
| FR | 2385971 A1 * | 10/1978 | ............ | F16L 37/098 |
| GB | 1145896 A * | 3/1969 | ............ | F16L 37/098 |
| KR | 10-1092708 B1 | 12/2011 | | |
| WO | WO-9618842 A1 * | 6/1996 | .......... | F16L 37/0987 |

* cited by examiner

HYDRAULIC TUBE CONNECTOR FOR VEHICLE

CROSS-REFERENCE(S) TO RELATED APPLICATIONS

The present application claims priority to Korean Patent Application No. 10-2016-0159250, filed on Nov. 28, 2016, the entire contents of which is incorporated herein for all purposes by this reference.

BACKGROUND OF THE INVENTION

Field of the Invention

The present invention relates to a hydraulic tube connector for vehicle, and more particularly, to a hydraulic tube connector for vehicle having improved productivity.

Description of Related Art

Generally, in a clutch system using hydraulic pressure, a hydraulic tube for transmitting hydraulic pressure from a clutch master cylinder to a release cylinder is used.

A connector is provided to connect the hydraulic tube to the clutch master cylinder. The connector connects the hydraulic tube to the clutch master cylinder, and prevents oil leakage.

Conventional connectors are made of steel, and accordingly have a disadvantage in view of cost and weight. Furthermore, the connectors made of a steel material need to be precision machined, resulting in a reduction of productivity.

Unlike the conventional steel connectors described above, a conventional connector made of a plastic material includes a plurality of slots, and the slots open outward to be press-fitted to a hydraulic tube. However, during the press-fitting process, the connector is permanently deformed so that clearance is made between the hydraulic tube and the connector, which may cause oil leakage. In addition, when plating and coating are applied to the hydraulic tube, the plating and coating of the hydraulic tube may be peeled off during the press-fitting process, which may increase the possibility of corrosion.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic tube connector for a vehicle configured for preventing oil leakage effectively by reducing the clearance between a connector and a hydraulic tube.

Various aspects of the present invention are directed to providing a hydraulic tube connector for a vehicle configured for improving corrosion resistance since the coating of a hydraulic tube is not peeled off when the hydraulic tube is assembled with a connector.

Various aspects of the present invention are directed to providing a hydraulic tube connector for a vehicle configured for improving productivity due to a simple structure of a mold for manufacturing a connector.

In accordance with an aspect of the present invention, a hydraulic tube connector for a vehicle may include a connector body including a through hole into which a tube having a tube protrusion protruding outward is inserted, a pair of guide grooves formed around the through hole, and a coupling member configured to couple the tube with the through hole of the connector body, wherein the coupling member may include a tube coupling portion configured to surround the tube and a pair of coupling guides configured to be inserted into the pair of guide grooves.

Each coupling guide may include a hook portion formed at an end portion, and each guide groove may include a hook groove into which the hook portion is inserted.

The guide groove may further include a coupling protrusion formed adjacent to the hook groove, and the coupling guide may further include a coupling groove corresponding to the coupling protrusion. The coupling protrusion may be fitted into the coupling groove when the hook portion is fitted into the hook groove.

The tube coupling portion may include a slit portion whose a side is cut off, and the tube may pass through the slit portion to be press-fitted to the tube coupling portion.

The through hole may include a first through hole and a second through hole provided at an end portion of the first through hole.

A diameter of the first through hole may be smaller than an external diameter of the tube protrusion, and a diameter of the second through hole may be greater than the external diameter of the tube protrusion.

When the coupling member is coupled with the tube, the tube may be coupled with the through hole of the connector body.

The coupling member may be coupled with the connector body and the tube by snap fit coupling.

The connector body and the coupling member may be made of a plastic material.

In accordance with an aspect of the present invention, a method of assembling a hydraulic tube connector for a vehicle, the method may include inserting a tube into a through hole formed in the connector body, inserting a coupling member into the connector body in a diagonal direction, and rotating the coupling member wherein the coupling member surrounds the tube.

The connector body may include a pair of guide grooves formed around the through hole, and the coupling member may include a pair of coupling guides configured to be inserted into the pair of guide grooves in the diagonal direction.

Each coupling guide may include a hook portion formed at an end portion, a supporting portion connected to the hook portion configured to support a tube protrusion, and a coupling groove formed between the hook portion and the supporting portion.

Each guide groove may include a hook groove into which the hook portion is inserted, an entry groove into which the coupling guide is inserted in the diagonal direction, and a coupling protrusion formed between the hook groove and the entry groove, and configured to be fitted into the coupling groove.

When the coupling member rotates to surround the tube, the hook portion may be fitted into the hook groove, and the coupling protrusion may be fitted into the coupling groove.

The coupling member may include a tube coupling portion configured to surround the tube, and the tube coupling portion includes a slit portion whose a side is cut off.

The tube may pass through the slit portion to be press-fitted to the tube coupling portion.

When the coupling member rotates to surround the tube, the tube may pass through the slit portion to be press-fitted to the tube coupling portion.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

It is to be understood that the singular forms "a," "an," and "the" include plural referents unless the context clearly dictates otherwise. It will be understood that when the terms "includes," "comprises," "including," and/or "comprising," when used in the present specification, specify the presence of stated features, figures, steps, components, or combination thereof, but do not preclude the presence or addition of one or more other features, figures, steps, components, members, or combinations thereof.

It will be understood that, although the terms first, second, etc. may be used herein to describe various components, these components should not be limited by these terms. These terms are only used to distinguish one component from another. For example, a first component could be termed a second component, and, similarly, a second component could be termed a first component, without departing from the scope of the present invention. As used herein, the term "and/or" includes any and all combinations of one or more of associated listed items.

In the following description, a vehicle may be one of various machinery for transporting humans, things, animals, etc. from a departure point to a destination. The vehicle may include a vehicle that travels on roads or rails, a vessel that sails the sea or river, and an airplane that flies the sky using the effects of the air.

Further, a vehicle running on a road or a track can move in a predetermined direction in accordance with the rotation of at least one wheel, and can include a three-wheeled or four-wheeled vehicle, a construction machine, a two-wheeled vehicle, a prime mover, a bicycle, and a train running on the track.

Hereinafter, embodiments according to an exemplary embodiment of the present invention will be described in detail with reference to the accompanying drawings.

Meanwhile, a hydraulic tube connector for vehicle according to an exemplary embodiment of the present invention may be coupled with various parts in a hydraulic system. For example, the connector may be coupled with a clutch master cylinder (CMC) in combination with an end portion of a tube that transfers hydraulic pressure from a clutch pedal to a transmission. In addition, the connector may be coupled with a concentric slave cylinder (CSC), a clutch release cylinder (CRC) or the like.

Figure 1:
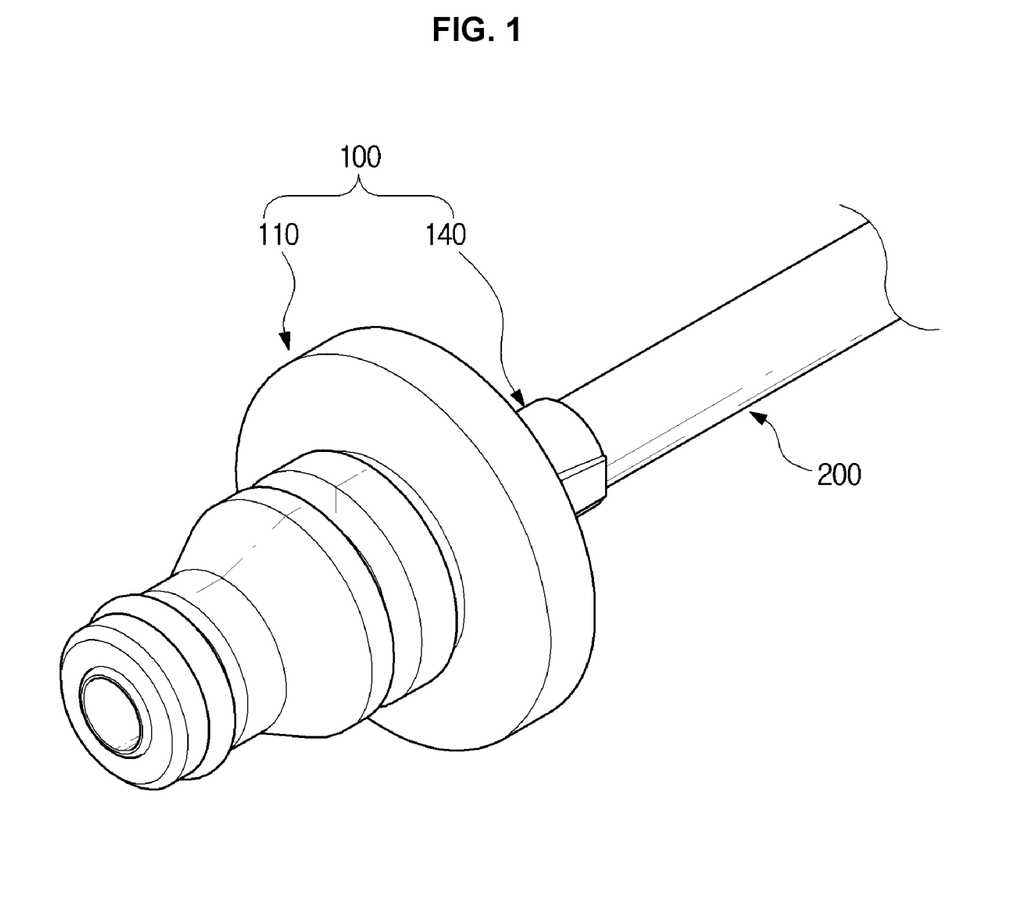
FIG. 1 is a view illustrating a state in which a hydraulic tube connector for vehicle according to an exemplary embodiment of the present invention is coupled with a tube.
Figure 2:
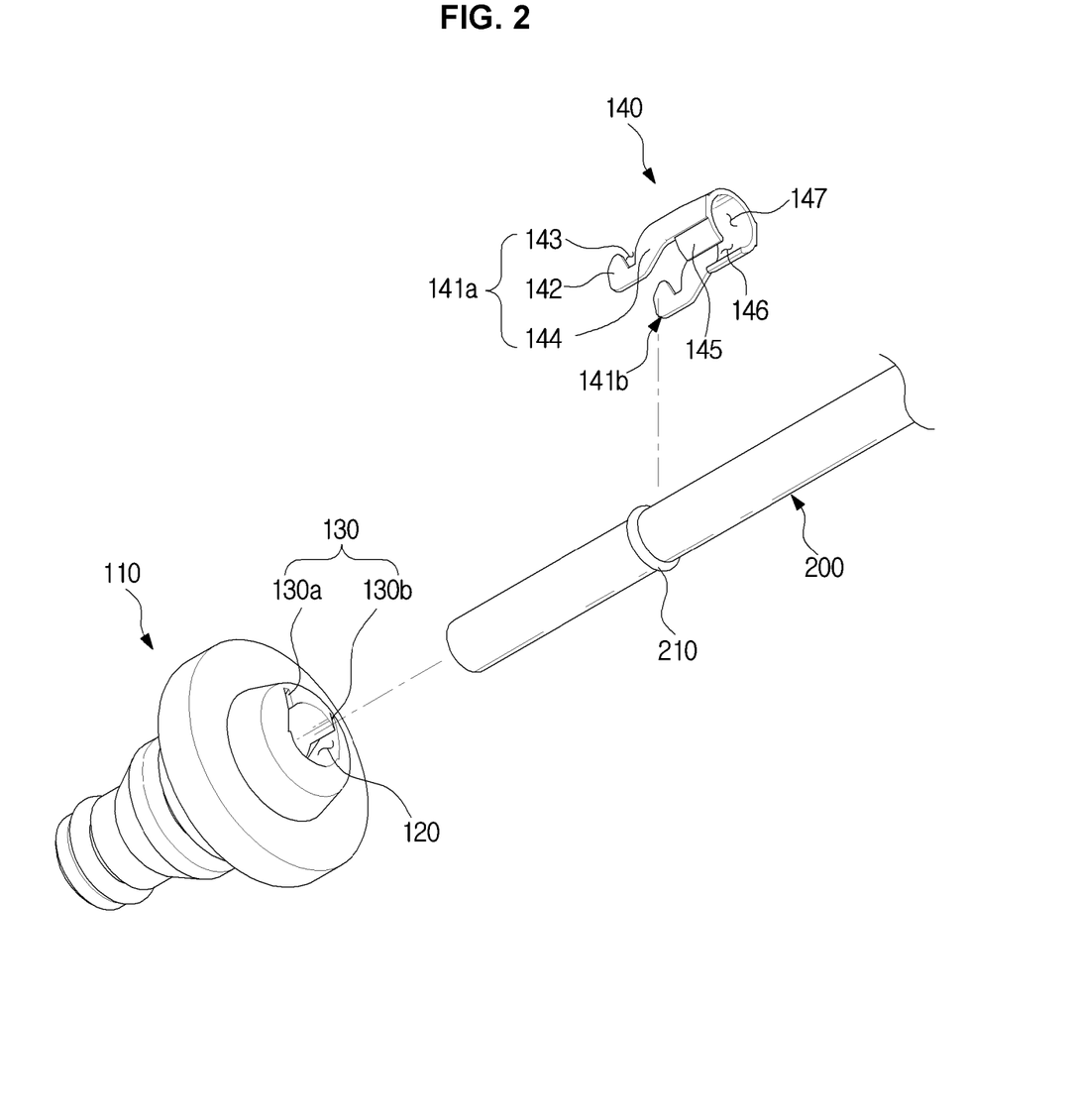
FIG. 2 is an exploded perspective view of a connector body, the tube, and a coupling member in the hydraulic tube connector shown in FIG. 1.

FIG. 1 is a view illustrating a state in which a hydraulic tube connector for vehicle according to an exemplary embodiment of the present invention is coupled with a tube. FIG. 2 is an exploded perspective view of a connector body, the tube, and a coupling member in the hydraulic tube connector shown in FIG. 1.

As shown FIG. 1 and FIG. 2, a hydraulic tube connector 100 for vehicle may include a connector body 110 and a coupling member 140.

A tube 200 that is connected to the hydraulic tube connector 100 for vehicle may include a tube protrusion 210.

The tube protrusion 210 may protrude outward from the tube 200. The tube protrusion 210 may be integrally formed with the tube 200 along a circumferential direction of the tube 200. Since the tube protrusion 210 protrudes outward from the tube 200, the external diameter of the tube protrusion 210 may be greater than that of the tube 200. The tube protrusion 210 may be provided around an end portion of the tube 200 that is coupled with the connector body 110.

The connector body 110 may include a through hole 120 and a guide groove 130.

The through hole 120 may penetrate the connector body 110. The tube 200 may be inserted into the through hole 120. The tube 200 can be inserted into the through hole 120 without passing through the through hole 120. The present case will be described later.

The guide groove 130 may be formed around the through hole 120. According to an exemplary embodiment of the present invention, a pair of guide grooves 130a and 130b may be formed around the through hole 120.

A pair of coupling guides 141a and 141b which are formed in the coupling member 140 may be inserted into the pair of guide grooves 130a and 130b. A process of coupling the coupling member 140 with the connector body 110 will be described later.

The coupling member 140 may couple the tube 200 with the connector body 110. The coupling member 140 may include the pair of coupling guides 141a and 141b configured to be inserted into the pair of guide grooves 130a and 130b, and a tube coupling portion 145 configured to be coupled with the tube 200.

Each of the coupling guides 141a and 141b may include a hook portion 142 formed at an end portion, a supporting portion 144 connected to the hook portion 142, and a coupling groove 143 formed between the hook portion 142 and the supporting portion 144.

The tube coupling portion 145 may surround the tube 200.

The tube coupling portion 145 may include a slit portion 146 whose a side is cut off. The tube 200 may pass through the slit portion 146 to be coupled with the tube coupling portion 145. The diameter of the slit portion 146 may be smaller than that of the tube 200. Therefore, when the tube 200 passes through the slit portion 146, the tube coupling portion 145 may be elastically deformed. The tube 200 may pass through the slit portion 146 when the slit portion 146 expands by the elastic deformation of the tube coupling portion 145 to be coupled with the tube coupling portion 145. When the tube 200 is coupled with the tube coupling portion 145, the tube 200 can be inserted into the internal volume 147 of the tube coupling portion 145. At the present time, the tube coupling portion 145 may surround the tube 200.

Figure 3:
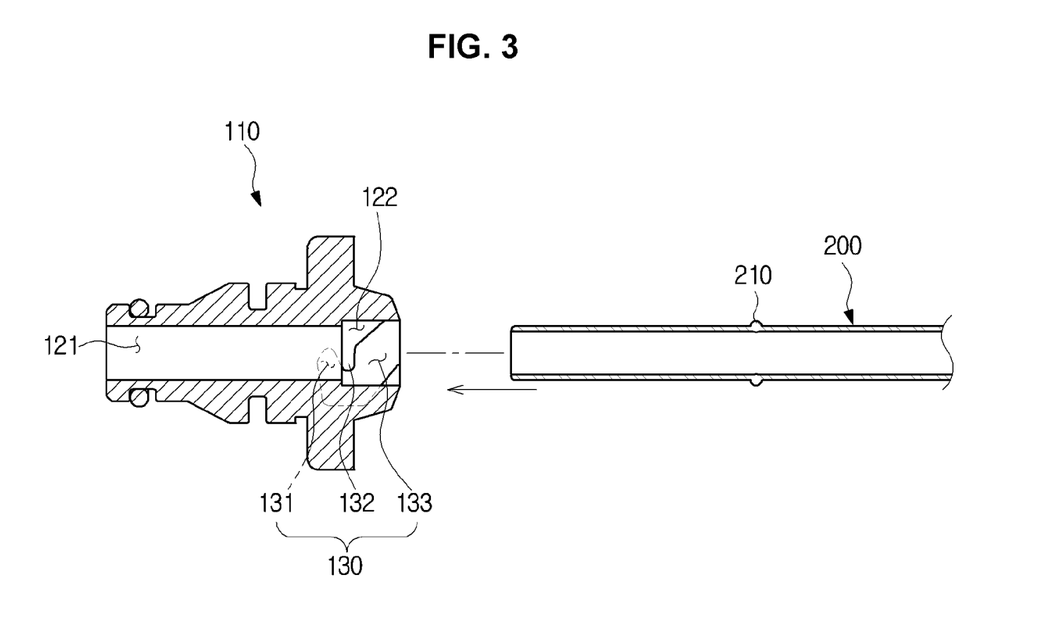
FIG. 3 is a cross-sectional view illustrating a state before the tube is inserted into the connector body in the hydraulic tube connector for vehicle according to an exemplary embodiment of the present invention.
Figure 4:
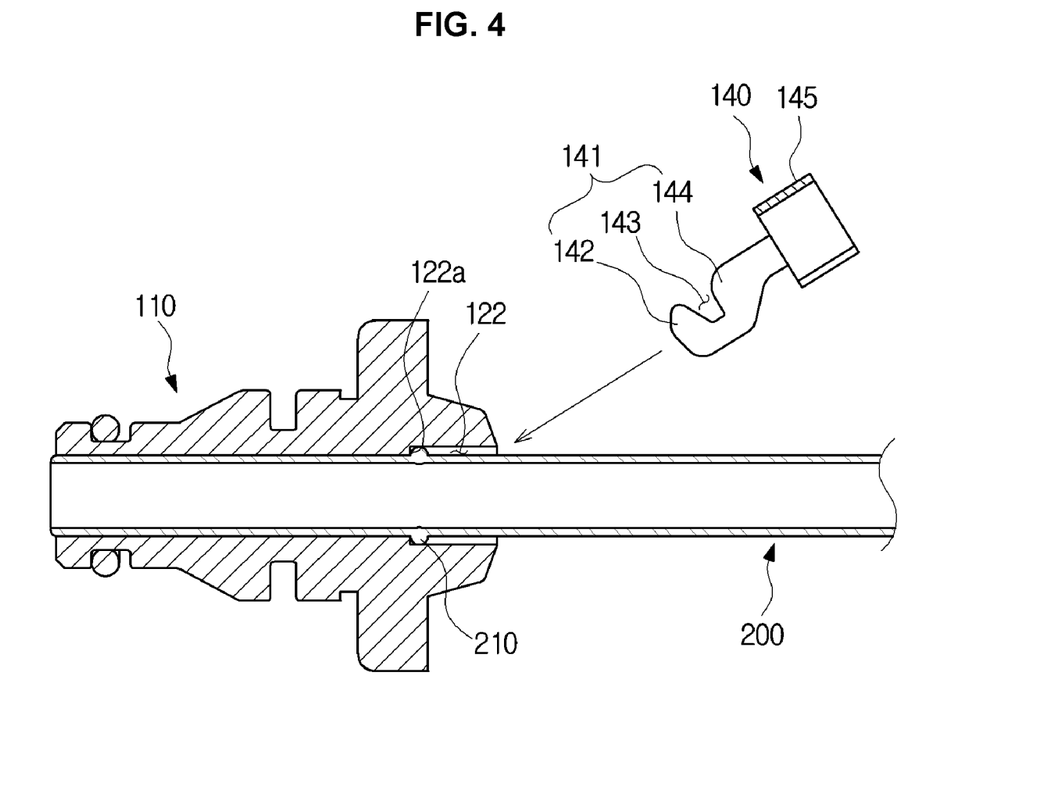
FIG. 4 is a cross-sectional view illustrating a state before the coupling member is coupled with the connector body after the tube is inserted into the connector body in the hydraulic tube connector for vehicle shown in FIG. 3.
Figure 5:
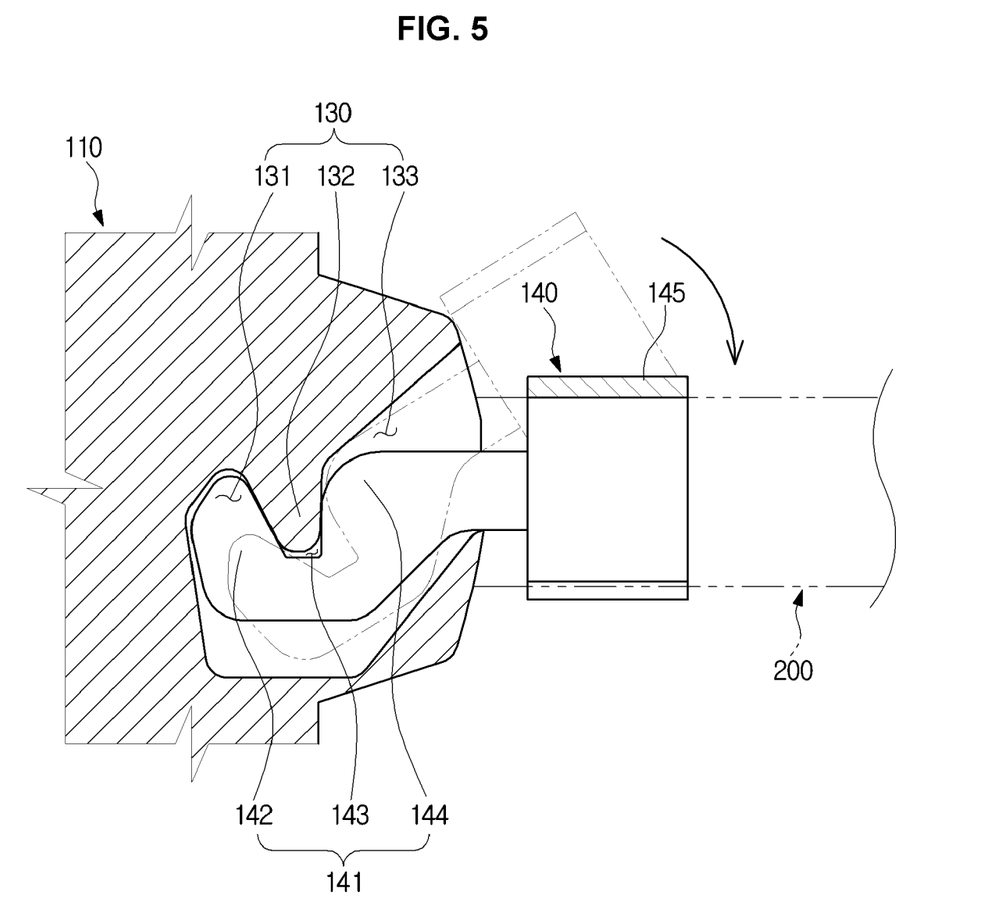
FIG. 5 is an enlarged cross-sectional view for describing operation in which the coupling member is coupled with the connector body and the tube in the state of FIG. 4.

FIG. 3 is a cross-sectional view illustrating a state before the tube is inserted into the connector body in the hydraulic tube connector for vehicle according to an exemplary embodiment of the present invention. FIG. 4 is a cross-sectional view illustrating a state before the coupling member is coupled with the connector body after the tube is inserted into the connector body in the hydraulic tube connector for vehicle shown in FIG. 3. FIG. 5 is an enlarged cross-sectional view for describing operation in which the coupling member is coupled with the connector body and the tube in the state of FIG. 4.

Hereinafter, operation in which the connector body, the tube, and the coupling member are coupled with each other will be described in detail with reference to FIG. 3 to FIG. 5

As shown in FIG. 3 and FIG. 4, the through hole 120 may include a first through hole 121 and a second through hole 122.

The first through hole 121 may be formed in a side of the connector body 110, and the second through hole 122 may be formed in the other side of the connector body 110. The first through hole 121 may communicate with the second through hole 122. That is, an end portion of the second through hole 122 may communicate with the first through hole 121.

The tube 200 may be inserted into the first through hole 121. Therefore, the internal diameter of the first through hole 121 may be greater than the external diameter of the tube 200.

The tube protrusion 210 may not be inserted into the first through hole 121. In other words, the tube protrusion 210 may not pass through the first through hole 121. Therefore, the internal diameter of the first through hole 121 may be smaller than the external diameter of the tube projection 210.

The second through hole 122 may be formed wherein the tube 200 and the tube protrusion 210 are inserted into the second through hole 122. Therefore, the internal diameter of the second through hole 122 may be greater than the external diameter of the tube projection 210.

Through the above-described structure, when the tube 200 is inserted into the through hole 120, the tube protrusion 210 may be inserted until it is caught by a stopping protrusion 122a formed between the first through hole 121 and the second through hole 122. Thereafter, even when a force is applied in a direction of inserting the tube 200 into the through hole 120, the stopping protrusion 122a may contact the tube protrusion 210 so that the tube 200 is not inserted into the through hole 120. At the present time, since the tube 200 is not fixed, it may be drawn out of the through hole 120 again. Accordingly, the coupling member 140 may be provided as a structure for coupling the tube 200 with the connector body 110.

As shown FIG. 3 and FIG. 5, the guide groove 130 of the connector body 110 may include a hook groove 131, a coupling protrusion 132, and an entry groove 133.

The hook groove 131 may be provided wherein a hook portion 142 of a coupling guide 141 which will be described later is inserted into the hook groove 131. The entry groove 133 may guide the coupling guide 141 in a diagonal direction thereof. The coupling protrusion 132 may be fitted to the coupling groove 143 of the coupling guide 141. The coupling protrusion 132 may be formed between the hook groove 131 and the entry groove 133.

A coupling guide 141 of the coupling member 140 may include a hook portion 142, a coupling groove 143, and a supporting portion 144.

The hook portion 142 may be formed at an end portion of the coupling guide 141. The supporting portion 144 may contact the coupling protrusion 132 and the tube protrusion 210. The coupling groove 143 may be formed between the hook portion 142 and the supporting portion 144.

After the tube 200 is inserted into the through hole 120, the coupling member 140 may be inserted into the guide groove 130 in the diagonal direction. Thereafter, the coupling member 140 may be rotated to couple the tube 200 with the through hole 120 of the connector body 110. After the coupling guide 141 enters the guide groove 130 in the diagonal direction, the coupling member 140 may be rotated in the direction in which the tube coupling portion 145 is coupled with the tube 200. When the coupling member 140 is rotated, the tube coupling portion 145 may be coupled with the tube 200, the hook portion 142 may be coupled with the hook groove 131, and the coupling protrusion 132 may be coupled with the coupling groove 143.

As shown FIG. 5, when the coupling member 140 rotates inside the guide groove 130, the hook portion 142 may be interlocked with the coupling protrusion 132. Accordingly, a movement of the coupling member 140 in the longitudinal direction of the tube 200 may be restricted. At the present time, the supporting portion 144 of the coupling member 140 may contact the tube protrusion 210 and press the tube protrusion 210. Also, a movement of the tube 200 in the radial direction may be restricted because the tube 200 is inserted into the through hole 120. Since the tube coupling portion 145 is coupled with the tube 200, a movement of the coupling member 140 in the radial direction may also be restricted.

Through the above-described process, the coupling member 140 may be coupled with the tube 200 and the connector body 110 by snap fit coupling. Also, since the coupling member 140 is coupled with the tube 200 and the connector body 110, the tube 200 may be inserted into the through hole 120 of the connector body 110.

According to various aspects of the present invention, the connector body 110 and the coupling member 140 may be made of a plastic material. Also, the connector body 110 and the coupling member 140 may be formed by injection molding. Accordingly, since the structure of a mold for manufacturing the connector body 110 and the coupling member 140 can be simplified, the productivity of the connector can be improved. In the related art, a connector body is made of a steel material, which is disadvantageous in view of cost and weight. Furthermore, the connector body should be precision machined to prevent oil leakage, resulting in high manufacturing cost.

Meanwhile, since the connector body 110 according to an exemplary embodiment of the present invention is made of a plastic material, it has an advantage in view of cost and weight, and also it can be easily injection-molded, reducing manufacturing cost.

Further, since the coupling member 140 according to an exemplary embodiment of the present invention can be coupled with the tube 200 and the connector body 110 by snap fit coupling, there is an advantage that the coupling method is simple.

Figure 6:
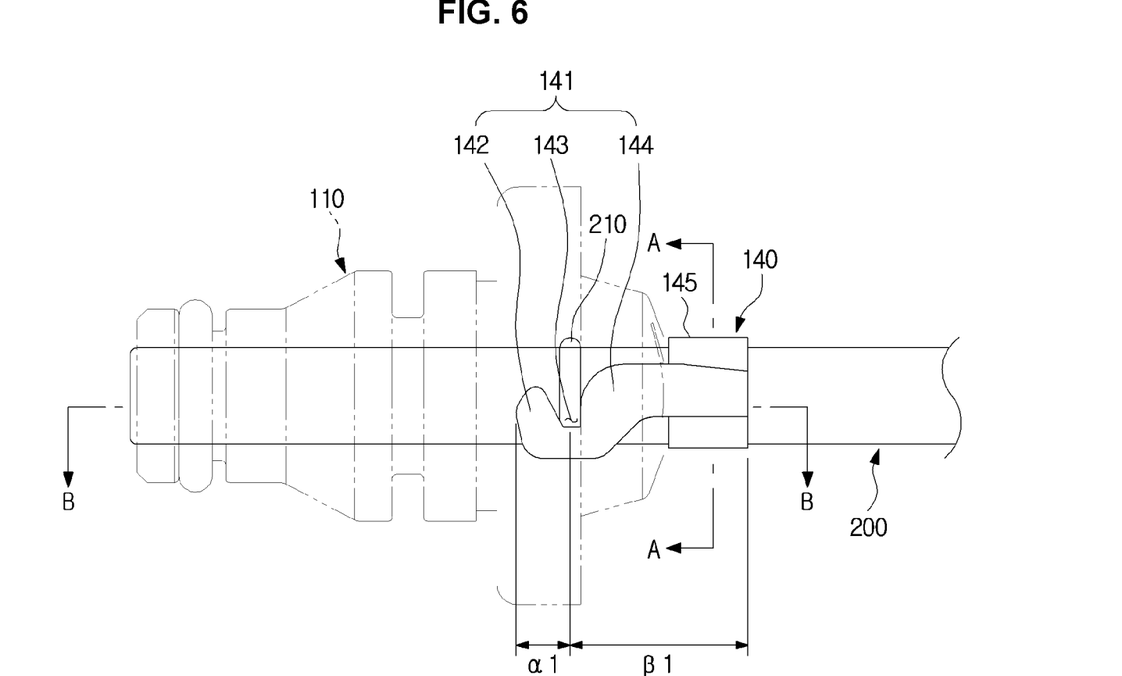
FIG. 6 is a cross-sectional view of the hydraulic tube connector for vehicle shown in FIG. 4, when the coupling member is coupled with the connector body and the tube.
Figure 7:
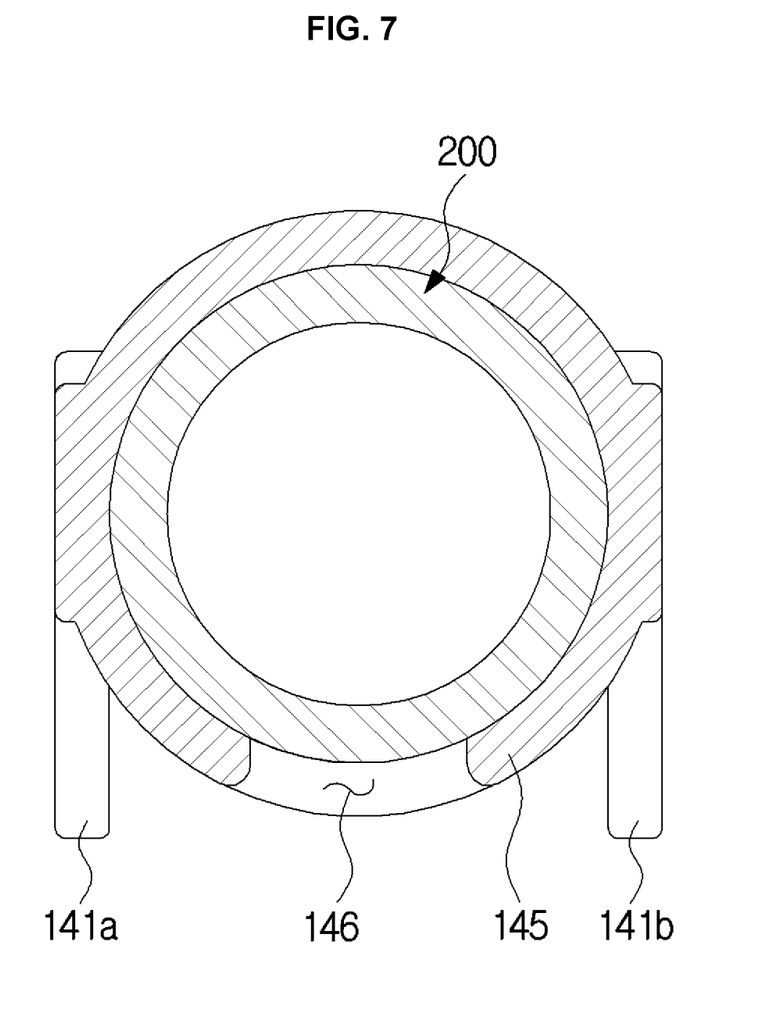
FIG. 7 is a cross-sectional view of the hydraulic tube connector for vehicle shown in FIG. 6, cut along a line A-A of FIG. 6.
Figure 8:
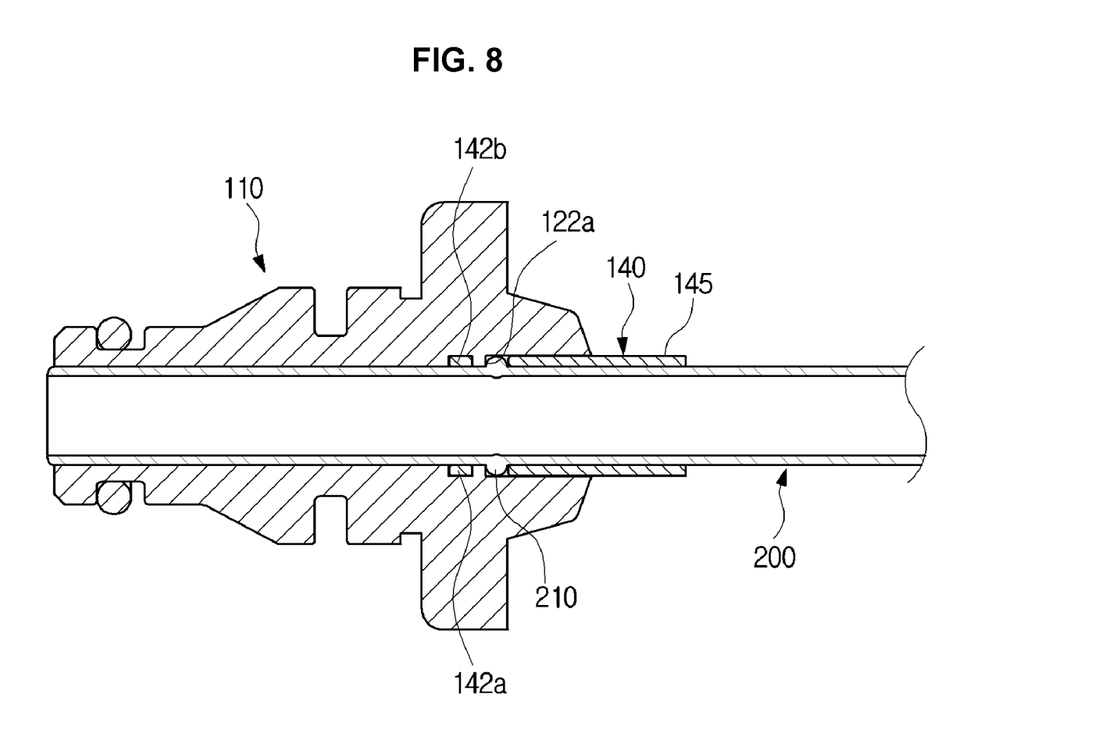
FIG. 8 is a cross-sectional view of the hydraulic tube connector for vehicle shown in FIG. 6, cut along a line B-B of FIG. 6.

FIG. 6 is a cross-sectional view of the hydraulic tube connector for vehicle shown in FIG. 4, when the coupling member is coupled with the connector body and the tube. FIG. 7 is a cross-sectional view of the hydraulic tube connector for vehicle shown in FIG. 6, cut along a line A-A of FIG. 6. FIG. 8 is a cross-sectional view of the hydraulic tube connector for vehicle shown in FIG. 6, cut along a line B-B of FIG. 6.

As shown in FIG. 6 and FIG. 8, when the coupling member 140 is coupled with the tube 200 and the connector body 110, the supporting portion 144 may contact the tube protrusion 210 to support it. As shown in FIG. 5, the supporting portion 144 may be in contact with the coupling protrusion 133.

A portion of the supporting portion 144 may contact the coupling protrusion 133, and the remaining part of the supporting portion 144 may contact the tube protrusion 210. With the present structure, the coupling guide 141 can be firmly coupled in the inside of the guide groove 130, and the tube 210 can be in close contact with the stopping protrusion 122a of the through hole 120. Since the tube protrusion 210 is in close contact with the stopping protrusion 122a, it is possible to prevent oil from leaking through a gap between the tube 200 and the through hole 120

Accordingly, the hydraulic tube connector 100 for vehicle according to an exemplary embodiment of the present invention can effectively prevent leakage of oil while having advantages of low manufacturing cost and light weight, as described above.

As shown in FIG. 7, the tube coupling portion 145 may surround the external circumference of the tube 200. The tube coupling portion 145 may include a slit portion 146 whose a side is cut off. The tube 200 may pass through the slit portion 146 to be coupled to the tube coupling portion 145. The diameter of the slit portion 146 may be smaller than that of the tube 200. Therefore, when the tube 200 passes through the slit portion 146, the tube coupling portion 145 may be elastically deformed. The tube 200 may pass through the slit portion 146 when the slit portion 146 expands by the elastic deformation of the tube coupling portion 145 to be coupled with the tube coupling portion 145.

Figure 9:
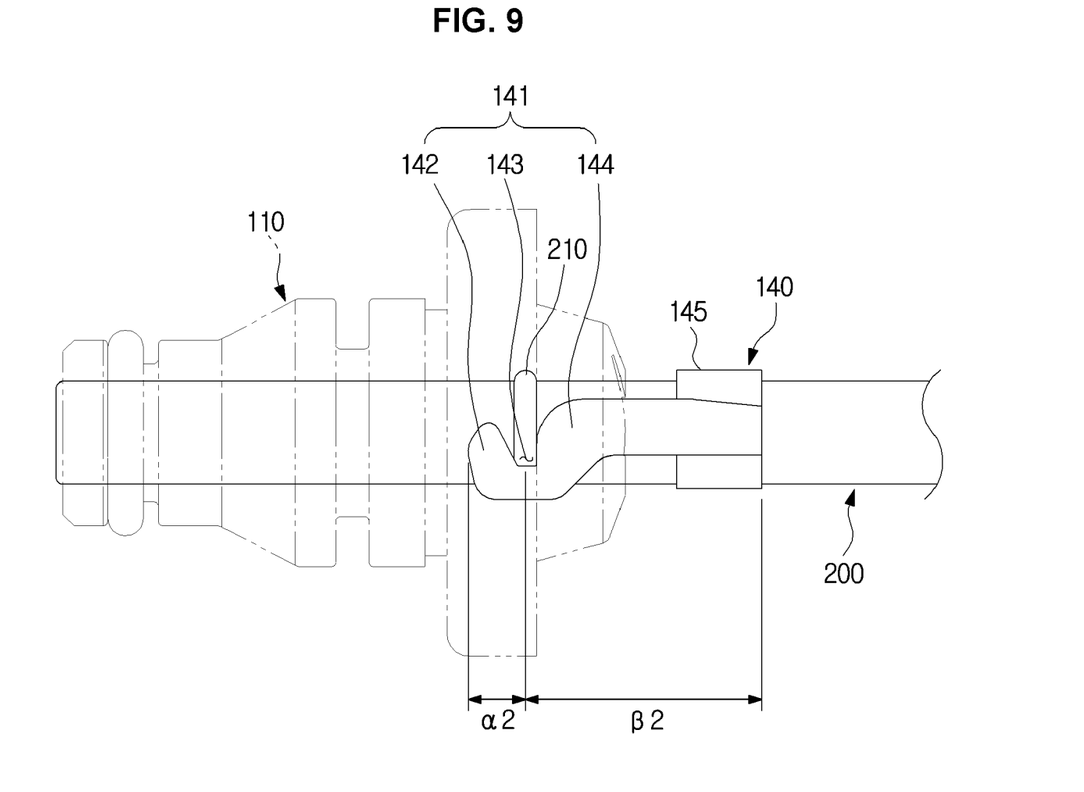
FIG. 9 is a cross-sectional view of a hydraulic tube connector for vehicle according to another exemplary embodiment of the present invention, when a coupling member is coupled with a connector body and a tube.

FIG. 9 is a cross-sectional view of a hydraulic tube connector for vehicle according to another exemplary embodiment of the present invention, when a coupling member is coupled with a connector body and a tube.

The coupling member 140 can provide a strong coupling force with a small applied force through the principle of leverage.

Referring to FIG. 6 and FIG. 9, in the coupling member 140, a length $β1$ from the hook portion to the end portion of the tube coupling portion may be longer than a length $α1$ of the hook portion. Accordingly, when the coupling member 140 is coupled with the connector body 110, a strong coupling force can be obtained with a small applied force. A user may couple the coupling member 140 to the connector body 110 by snap fit coupling, and a force applied by the user's hand may be much weaker than a force exerted by the machine. However, as described above, since the length $β1$ from the hook portion to the end portion of the tube coupling portion is longer than the length $α1$ of the hook portion, the principle of leverage can be used. That is, the force applied by the user can be amplified by the lever ratio $β1/α1$.

Further, as shown in FIG. 9, it is possible to increase the length $α2$ from the hook portion to the end portion of the tube coupling portion, while maintaining the length $α2$ of the hook portion. In the present case, since the lever ratio $β2/α2$ increases, the coupling member can have a stronger coupling force even when the user applies the same force.

As described above, according to the technical concept of the present invention, by adjusting the lever ratio of the coupling member 140, the coupling force between the tube and the connector body can be adjusted.

For convenience in explanation and accurate definition in the appended claims, the terms "upper", "lower", "internal", "outer", "up", "down", "upwards", "downwards", "front", "rear", "back", "inside", "outside", "inwardly", "outwardly", "internal", "external", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described to explain certain principles of the invention and their practical application, to enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic tube connector for a vehicle comprising:
   a connector body including a through hole into which a tube having a tube protrusion protruding outward therefrom is inserted, and a pair of guide grooves formed around the through hole; and a coupling member configured to couple the tube with the through hole of the connector body;
wherein the coupling member includes:
a tube coupling portion configured to surround the tube; and
a pair of coupling guides configured to be inserted into the pair of guide grooves,
wherein the tube coupling portion includes a slit portion formed by cutting a side of the tub coupling portion, and the tube is configured to pass through the slit portion to be press-fitted to the tube coupling portion,
wherein each coupling guide includes a hook portion formed at an end portion thereof, and each guide groove includes a hook groove, wherein an entrance of each guide groove is formed in a diagonal direction with respect to a longitudinal axis of the connector member and the hook portion is inserted into the hook groove, and
wherein the hook portion is inserted in the hook groove when the tube is press-fit to the slit portion of the tube coupling portion.

2. The hydraulic tube connector according to claim 1, wherein
the guide groove further includes a coupling protrusion formed adjacent to the hook groove,
the coupling guide further includes a coupling groove corresponding to the coupling protrusion, and
the coupling protrusion is fitted into the coupling groove when the hook portion is fitted into the hook groove.

3. The hydraulic tube connector according to claim 1, wherein the through hole includes a first through hole and a second through hole provided at an end portion of the first through hole.

4. The hydraulic tube connector according to claim 3, wherein a diameter of the first through hole is smaller than an external diameter of the tube protrusion, and a diameter of the second through hole is greater than an external diameter of the tube protrusion.

5. The hydraulic tube connector according to claim 1, wherein, when the coupling member is coupled with the tube, the tube is coupled with the through hole of the connector body.

6. The hydraulic tube connector according to claim 1, wherein the coupling member is coupled with the connector body and the tube by snap fit coupling.

7. The hydraulic tube connector according to claim 1, wherein the connector body and the coupling member are made of a plastic material.

* * * * *